US008422745B2

(12) United States Patent
Hu et al.

(10) Patent No.: US 8,422,745 B2
(45) Date of Patent: Apr. 16, 2013

(54) METHOD OF MODELLING AN UNDERGROUND HETEROGENEOUS MEDIUM FROM MULTIPOINT STATISTICS

(75) Inventors: Lin-Ying Hu, Bougival (FR); Virginie Patacz, Vimy (FR)

(73) Assignee: IFP, Cedex (FR)

( * ) Notice: Subject to any disclaimer, the term of this patent is extended or adjusted under 35 U.S.C. 154(b) by 429 days.

(21) Appl. No.: 12/767,852

(22) Filed: Apr. 27, 2010

(65) Prior Publication Data

US 2010/0272324 A1    Oct. 28, 2010

(30) Foreign Application Priority Data

Apr. 28, 2009   (FR) ...................................... 09 02071

(51) Int. Cl.
*G06K 9/00*   (2006.01)
(52) U.S. Cl.
USPC ......................................................... 382/109
(58) Field of Classification Search ................... 382/109
See application file for complete search history.

(56) References Cited

U.S. PATENT DOCUMENTS 7,853,045 B2 *  12/2010  Touati et al. .................. 382/109
2006/0041410 A1   2/2006  Strebelle

FOREIGN PATENT DOCUMENTS

FR          2 905 181      2/2008

OTHER PUBLICATIONS

English Official Translation of Tatiana Chugunova et al. FR P.N. 2905181.*
Strebelle, S: "Conditional Simulation of Complex Geological Structure Using Multi-point Statistics", Mathematical Geology, vol. 34, No. 1, Jan. 1, 2002, pp. 1-21, XP007911730.
Chugunova, Tatiana L. et al: "Multiple-Point Simulations Constrained by Continuous Auxiliary Data", Mathematical Geosciences, Springer-Verlag, Berlin/Heidelberg, vol. 40, No. 2, Jan. 23, 2008, pp. 133-146, XP019578219; ISSN: 1874-8953.
Zhang, Ting, et al: "A Statistical Information Reconstruction Method of Images Based on Multiple-Point Geostatistics Integrating Soft Data with Hard Data", Computer Science and Computational Technology, 2008. ISCSCT '08 International Symposium on, IEEE, Dec. 20, 2008, pp. 573-578, XP031382392.

* cited by examiner

*Primary Examiner* — Brian Le
(74) *Attorney, Agent, or Firm* — Antonelli, Terry, Stout & Kraus, LLP.

(57) ABSTRACT

A method of constructing an image representing the distribution of a categorical physical property representative of an underground zone having applications for petroleum reservoir development. A first training image representative of a geometrical structure of the categorical property is constructed. Training images representative of the distributions of several auxiliary properties are then constructed from the first training image. A probability law of the categorical property and a probability law of each auxiliary property are determined, from each training image, for a given pixel according to the values of the neighboring pixels. A probability law of the categorical property is calculated from these laws and from the images representative of the distribution of the auxiliary physical properties in the zone, and for each pixel of the image to be constructed. Finally, the value of the categorical property is determined by carrying out a random selection for the calculated probability law.

25 Claims, 4 Drawing Sheets

Fig. 3A
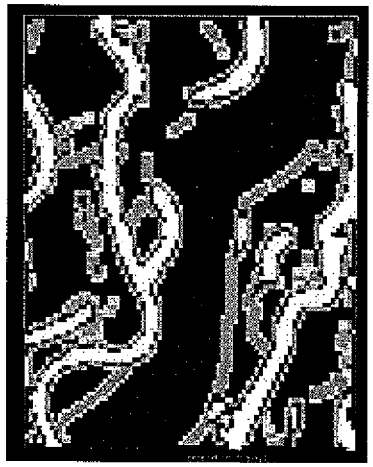 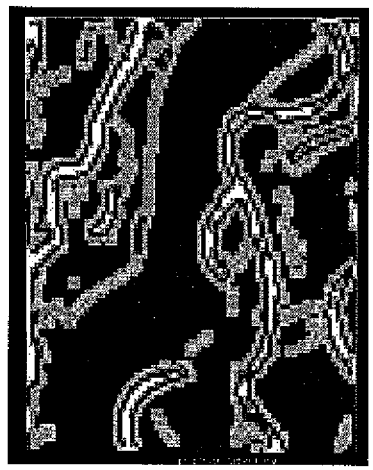 
Fig. 3B          Fig. 3C

METHOD OF MODELLING AN UNDERGROUND HETEROGENEOUS MEDIUM FROM MULTIPOINT STATISTICS

BACKGROUND OF THE INVENTION

1. Field of the Invention

The invention relates to petroleum reservoir exploration and development, and more particularly to petroleum reservoir imaging. Constructing images representative of the subsoil and compatible with data measured in wells and/or with the entire reservoir favors the development of such reservoirs.

2. Description of the Prior Art

Studying a petroleum field requires constructing models referred to as "geological models" in a broad sense. These models, which are well known and widely used in the petroleum industry, allow determination of many technical parameters relative to prospecting, study or development of a reservoir, and of hydrocarbons. In fact, the geological model is representative of the structure of the reservoir and of the behavior thereof. It is thus possible to determine which zones are the most likely to contain hydrocarbons, the zones in which it can be interesting/necessary to drill an injection well in order to enhance hydrocarbon recovery, the type of tools to use, the properties of the fluids used and recovered, etc. These interpretations of geological models in terms of "technical development parameters" are well known, even though new methods are regularly developed. It is therefore crucial, in the petroleum field, to construct a model as precise as possible. Integration of all the available data is therefore essential.

Petroleum reservoirs are generally very heterogeneous and fractured media. Modelling a reservoir which is constructing a geological model representative of the reservoir, requires construction methods referred to as "probabilistic" due to the limitation of available information (limited number of wells, etc.). The geological models constructed from these probabilistic methods are therefore referred to as "stochastic models". Construction of a stochastic reservoir model first has to depend on the environment of the geological deposit, which allows representation of the major heterogeneities controlling the flow of fluids. A model then has to be constrained by quantitative data, such as core data, log data, seismic data, which allows a further increase of the reliability of the model for production prediction.

A geological model is a model of the subsoil, representative of both its structure and its behavior. Generally, this type of model is represented on a computer, which is referred to as a numerical model. In two dimensions (2D), it is referred to as a map. Thus, a map corresponds to an image of pixels with each pixel containing information relative to the behavior of the subsoil being studied (a petroleum reservoir for example). These pixels correspond to a precise geographic position and are located by coordinates. When values are assigned to a pixel, by simulation for example, it is referred to as a simulation point. The representative image (map or model) is generated on any medium (paper, computer screen, etc.).

The images obtained from multi-Gaussian type methods or, more generally, from pixel type methods affords the advantage of being more readily constrained by quantitative measurements. However, the drawback of such methods is that they are difficult to account for the geological concepts. The term "geological concept" designates the physical rules of sedimentation in each type of depositional environment.

On the other hand, images obtained from object type methods and from genetic type methods (based on sedimentary processes) allow better accounting for the geological architecture. However, constraining them by quantitative measurements is often more difficult to achieve.

Simulation type image construction methods using multipoint statistics allow this problem to be solved. In fact, models generated by object or genetic type simulation provide non-constrained images that can be used as training images for multipoint statistics inference. On the basis of these statistics, it is then possible to regenerate images pixel by pixel, using a sequential simulation algorithm. These images reproduce the main characteristics of the images obtained from object or genetic type methods. The flexibility of sequential simulation for conditioning to quantitative data is an additional asset. The multipoint geostatistical approach is first developed within a stationary context where the spatial variability of the reservoir heterogeneity is assumed to stabilize beyond a certain distance, markedly smaller than the size of the field. This approach is described in the following documents:

Guardiano, F. and Srivastava, M. (1993): Multivariate Geostatistics: Beyond Bivariate Moments. In Soares, A., ed., Geostatistics Troia'92, vol. 1: Kluwer Acad. Publ., Dordrecht, The Netherlands, p. 133-144;

Strebelle S. and Journel, A. (2000): Sequential Simulation Drawing Structures from Training Images. In Kleingeld and Krige (eds.), Geostatistics 2000 Cape Town, Volume 1.

Now, in most cases in practice, the heterogeneity is non stationary on the scale of the petroleum field being studied. This non-stationary variability is often accessible via information, from seismic data for example, of low resolution but covering the entire field.

There are also known methods allowing accounting for this information referred to as auxiliary in a simulation by the multipoint approach.

A first method uses, in addition to a training image of the principal variable, a second training image of the auxiliary variable. The latter is obtained by numerical simulation on the former. For a given state of a neighborhood of points of the principal variable and a datum of the auxiliary variable at the simulation point, all the point configurations coherent with both the state of this neighborhood and this auxiliary datum are identified and the empirical law of the principal variable at the simulation point, conditioned by both the state of this neighborhood and the auxiliary datum, is obtained. This method, which is quite direct and coherent, however involves a major drawback. In fact, due to the often continuous character of the auxiliary variable, it is generally unlikely to find a configuration, in both training images, which coincide with both the state of a given neighborhood and a datum of the auxiliary variable. One way of dealing with this difficulty is to classify the auxiliary variable into several classes, which makes the method somewhat arbitrary while only slightly mitigating the problem. The following document describes the various aspects of this method:

Strebelle S. (2000): Sequential Simulation Drawing Structures from Training Images. Ph.D. Thesis, Department of Geological and Environmental Sciences, Stanford University.

Another method based on an analytical model, the "tau model", is described in:

Journel A. G. (2002) Combining Knowledge From Diverse Sources: An Alternative to Traditional Data Independence Hypotheses. Math. Geology, Vol. 35, N. 5.

The use of this method for non-stationary multipoint simulation is notably described in:

Strebelle S., Payrazyan K., Caers J. (2002): Modeling of a Deepwater Turbidity Reservoir Conditional to Seismic Data Using Multiple-Point Geostatistics. SPE 77425.

This method permits expression of the probability of an event denoted by A knowing the events denoted by B and C as a function of the probability of A and those of A knowing B and C respectively. Using this method in the non-stationary multipoint simulation calculates the probability of A (presence of a lithology at the simulation point) knowing B (state of a lithology neighborhood) and C (given value of the auxiliary variable) as a function of the probability of A (global lithology proportion), the probability of A knowing B (from the training image of the auxiliary variable) and the probability of A knowing C (from the auxiliary constraint). This function depends on a "tau" parameter. The difficulty in using this method in practice comes from the inference of this parameter, which depends not only on each reservoir but also on each simulation point of a reservoir. In the current use of this method, "tau" is simply assigned to value 1. The degree of approximation of such an assignment is difficult to evaluate.

The previous two methods, that is the classification algorithm and the tau model, show geometrical artifacts without reproducing the non-stationary constraints. A third non-stationary multipoint simulation method is disclosed in French Patent 2,905,181 or from the following publication: Chugunova, T. and Hu, L. Y. (2008)" Multiple-point Simulations Constrained to Continuous Auxiliary Data, Mathematical Geosciences, Vol. 40, No. 2. This method avoids the drawbacks of the previous two algorithms by integrating continuous spatial constraints. However, this method is limited because it does not account for several auxiliary constraints. Now, in common practice, where multiple auxiliary constraints are generally available, all of these data are preferably accounted for in the quality of the petroleum reservoir image obtained.

SUMMARY OF THE INVENTION

The method according to the invention is an alternative method allowing construction of an image representative of a petroleum reservoir, from data measured in wells and/or the entire reservoir being studied. The method allows construction of an image representing the distribution of a categorical physical property, such as the lithology or the fracturation of the subsoil, by accounting for the geological concepts, the non-stationary character of the heterogeneity on the scale of the petroleum reservoir being studied, and by integrating any available data, in a form of spatial constraints, whether continuous or not, quantitative and/or qualitative.

The invention constructs an image from the geological structure and to constrain this image by:
accounting for the geological concepts to account for the geological architecture of the reservoir;
accounting for the non-stationary character of the heterogeneity on the scale of the petroleum reservoir understudy; and
integrating any available data as spatial constraints, continuous or not, quantitative and/or qualitative, to construct a model as precise as possible.

There are many methods of constructing images, but none satisfies all the constraints met by the invention as discussed below to be met satisfactorily.

The invention relates to a method of constructing an image representative of the distribution of a categorical physical property in a porous heterogeneous medium. Each pixel of this image is associated with a geographic position. The method comprises:
constructing a first training image by assigning to each pixel of the image to be constructed a categorical physical property value;
selecting at least two auxiliary physical properties whose distributions in space are representative of a distribution in space of the categorical physical property;
constructing, for each auxiliary physical property, a training image by assigning to each pixel the training images an auxiliary physical property value determined from the first training image,
defining a central pixel for any pixel of a training image, a neighborhood of L pixels that are the closest to the central pixel, and determining for all the neighborhoods from 0 pixel to L pixels and for all states of the neighborhood that is all of the values of the categorical physical property taken by the pixels of the neighborhood, an empirical histogram of values of the categorical physical property at the center of the neighborhood conditioned by the states, and an empirical histogram of values of each auxiliary physical property at the center of the neighborhood conditioned by the states;
constructing images for each auxiliary physical property, by assigning to each pixel of the training images an auxiliary physical property value obtained from measurements performed within the porous heterogeneous medium; and
for each pixel of the image to be constructed:
calculating a probability law of the categorical physical property from values taken by all pixels in a neighborhood of the pixel, the values at the pixel of the auxiliary physical properties being obtained from the images, and the empirical histograms;
determining a categorical physical property value at the pixel of the image to be constructed by carrying out a random selection in the calculated probability law; and
constructing the image representative of the distribution of the categorical physical property by repeating the calculation of the probability law and the determining of a categorical physical property value for each pixel of the image to be constructed.

According to the invention, the histograms can be determined by scanning simultaneously the training images of the neighborhood.

According to an embodiment, the histograms can be stored in a tree structure having a set of nodes of levels with indices between 0 and number L corresponding to the size of the neighborhood, a node of level n corresponding to a complete neighborhood of size n, each node of the tree being associated with a particular state of a complete neighborhood of the categorical property PP. According to this embodiment, the probability law of the categorical physical property, at the level of a pixel to be simulated, can be calculated by means of the following method:
selecting tree nodes corresponding to a level Ns, corresponding to a complete neighborhood of size s;
among all the nodes of level Ns, identifying those nodes for which the values of the categorical physical property of the neighborhood pixels are identical to those of the neighborhood of the pixel to be simulated;
among the identified nodes, selecting nodes for which an empirical histogram of each auxiliary physical property is compatible with a corresponding auxiliary physical property obtained from measurements; and
calculating the categorical physical property law of the pixel to be simulated using the selected nodes and by multiplying the empirical histograms determined for the nodes.

According to the invention, an auxiliary physical property can be compatible with an empirical histogram if the auxiliary physical property ranges between a minimum and a maximum of the auxiliary values of the histogram, or if the histogram had a non-zero probability for the auxiliary physical property.

Finally, according to the invention, the categorical physical property can be selected from among one of the following properties: lithology, fracturation state, and presence of channels. The auxiliary physical properties can be selected from among the following properties: lithologic proportions, fracture density, seismic attributes.

BRIEF DESCRIPTION OF THE DRAWINGS

Other features and advantages of the method according to the invention will be clear from reading the description hereafter of non-limitative application examples, with reference to the accompanying figures wherein:

FIGS. 3A, 3B and 3C respectively show the training image of the principal property, one of the three auxiliary property training images and one of the three auxiliary property real images;

DETAILED DESCRIPTION OF THE INVENTION

Figures 1A, 1B, 1C:
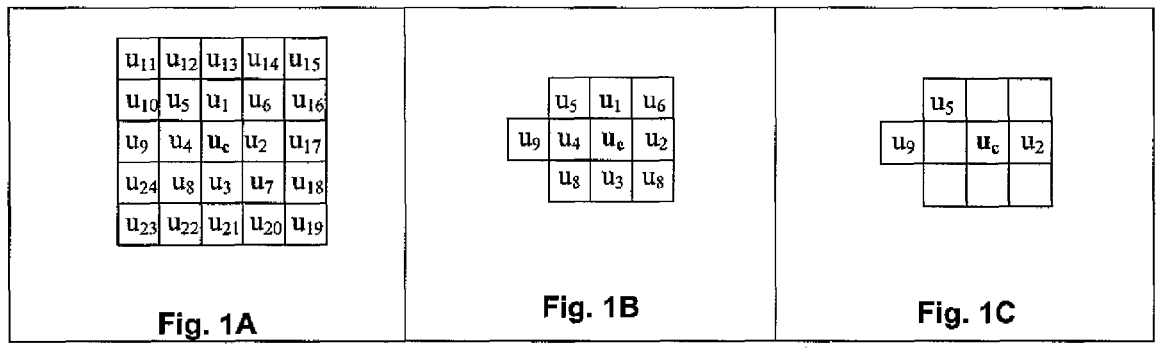
FIGS. 1A, 1B and 1C respectively show a rectangular template, whose number of pixels is L=24, a complete neighborhood and a non-complete neighborhood.

The present invention relates to a method of constructing an image representing a geological model representative of the structure and of the behavior of an underground zone such as a petroleum reservoir or an aquifer, allowing determination of technical parameters relative to prospecting, study or development of the zone. An image has a set of pixels and each pixel is associated with a geographic position.

The subsoil is a porous heterogeneous medium that can be characterized by various types of properties: categorical physical properties (lithologies, fracturation state, etc.), continuous physical properties (porosity, permeability, etc.), and indirect physical properties (from seismic surveys for example).

The method according to the invention allows generation of an image representative of categorical physical properties. Examples thereof are lithologies (limestone, sandstone, clay, etc.) or the fracturation state. Construction of an image representative of a categorical physical property comprises associating with each pixel of the image a value of this categorical physical property. This categorical physical property is referred to as principal property (PP) in the description below.

According to the invention, the values of the principal property (PP) are constrained by various types of data corresponding to different physical properties:

data resulting from indirect observations: for example data obtained from seismic surveys, such as seismic amplitudes or, after interpretation, fracture densities. These physical properties constitute the auxiliary properties (PA), they represent trends of the principal property (PP) and they are known at each pixel of the image; and data directly collected in the medium (PC), for example the lithologic description along a well, which provides the value of the principal property (PP) at a pixel (well location).

The method according to the invention mainly comprises five steps:

1—constructing a first training image representative of the geometrical structure of the principal property PP;

2—constructing, for each auxiliary property PA, an auxiliary training image, representative of the distribution of PA, from the first training image;

3—calculating empirical statistics from values contained in all of the images;

4—acquiring real data relative to the auxiliary properties; and

5—constructing an image representative of the distribution of principal property PP constrained by the distribution of all the auxiliary properties PA obtained from the real data.

1—Constructing a First Training Image Representative of the Geometrical Structure of Principal Property PP In this step, a first training image is constructed by assigning to each pixel of this first training image a categorical physical property value. The categorical physical property can be selected from among one of the following properties: lithology, fracturation state and presence of channels.

The first training image can for example be constructed based on sedimentary processes because the first training does not have to be conditioned to the quantitative data. Such methods are well known. The following work is referenced by way of example:

Hu, L. Y., Joseph, P. and Dubrule, O., "*Random Genetic Simulation of the Internal Geometry of Deltaic Sand Bodies*", SPE Formation Evaluation, December 1994, p. 245-250.

Lopez, S., Galli, A. and Cojan, I., "*Fluvial Meandering Channelized Reservoirs: a Stochastic & Process-Based Approach*", In Proceedings of the of the Annual Conference of the International Association for Mathematical Geology, 6-12 September, 2001, Cancun, Mexico.

This type of method allows representation of the major heterogeneities only from knowledge of the environment of the geological deposit. This first training image is thus constructed from a priori information and it constitutes a representation of the environment of the geological deposit. A value of the principal property (PP) is assigned to each pixel of the first training image. A first training image thus defines a geometrical structure of principal property (PP). At this step, it is not the real geometrical structure of principal property (PP) but it is a possible representation.

2—Constructing a Training Image Representative of the Distribution of Each Auxiliary Property PA The first training image represents a geometrical structure of the principal property (PP) for a given depositional environment. From this first training image that constitutes an environment, images representing the distribution of each possible auxiliary property (PA), are constructed considering the environment. An auxiliary physical property value which is determined from the first training image is therefore assigned to each pixel of the images.

According to the invention, at least two auxiliary physical properties are selected, whose distributions in space are representative of the distribution in space of categorical physical property (PP). These properties can for example be selected from among the following properties: lithologic proportions, fracture density, and seismic attributes.

Such images can be constructed using geophysical modelling techniques such as ray tracing which are well known, in order to determine seismic amplitudes likely to be measured during a seismic survey in a geological medium defined by the first training image.

Each auxiliary training image thus represents a distribution of an auxiliary property (PA), in accordance with the geological environment defined by the first image. It is obtained by numerical simulation techniques which are known (solution of a system of physical equations) using the first image as the environment.

3—Calculating Empirical Statistics from the Values Contained in all the Training Images A set of training images is available at the end of the first two steps: the first training image represents the depositional environment which it is representative of a geometrical structure of the categorical physical property (PP), and each one of the other auxiliary training images represents a distribution of an auxiliary property (PA) meeting the environment of the first training image.

In the third step, images are processed for which a value is associated with each pixel: a value of principal property PP for the first training image and value of an auxiliary property PA for each auxiliary training image. These images are referred to as training images because, knowing the values at each pixel, it is possible to establish a relation between the geometrical structure of the principal property and the values of the auxiliary properties. It will be possible to construct a complete image (step 4) from this relation, from known and real values of principal property PP at some pixels (data PC) and from known and real values of auxiliary properties PA at all pixels.

During this step, the geometrical structure of the principal property is thus captured and associated with auxiliary data in order to recreate the structure from the auxiliary data when the value of the principal property at each pixel (step 4) is not known. Statistics allowing extraction of the geometrical structures of the principal property and their distribution in the simulation field, that is the geographic space for which a model of the subsoil (petroleum reservoir for example) is to be constructed, are therefore calculated from all of the training images.

An object referred to as "template" by specialists is first defined to evaluate these statistics. It is in fact an exploration window also called a "mask". This object is a set of pixels: a central pixel and L ordered neighbouring pixels. This exploration window can for example correspond to a rectangle. FIG. 1A illustrates such an exploration window whose central pixel is represented by $u_c$ and the neighboring pixels by $u_1$, $u_2$, etc. The exploration window (template) is characterized by its shape and its number of pixels (L+1). The latter is determined according to the size of the geometrical structures of interest. These structures can be, for example, faults, channels, etc. The number L, while being relatively small in relation to the number of pixels of the image, has to be large enough so as to cover the size of the geometrical structures of interest (Strebelle S. (2000), *Sequential Simulation Drawing Structures from Training Images*, Ph.D. Thesis, Department of Geological and Environmental Sciences, Stanford University). In FIG. 1A, L=24.

Using the template, the training images are scanned simultaneously by positioning the center of the template on any pixel of the images, then by displacing the center of the exploration window (template) simultaneously on the images so that all the pixels of the images are visited once and only once. For each position of the exploration window (template):

a—the value of the principal property at the center of the template is identified;

b—the value of the auxiliary property at the center of the template is identified, for each auxiliary image; and c—the values of the principal property in the complete neighborhood, associated with the central point of the template, are identified.

For each state of a complete neighborhood of size between 0 and L, the empirical histogram of the values of the principal property at the center of the neighborhood and that of the values of each auxiliary property at the center of the neighborhood are calculated. What is referred to as the state of a neighborhood is the values taken by all of the pixels of the neighborhood.

These empirical histograms are stored in a structure. This structure is called a "tree" because of its arborescent shape and it constitutes the support of the statistical data. The structure of this tree is similar to that described by Strebelle and Journel in:

Strebelle S, and Journel A., "Sequential Simulation Drawing Structures from Training Images", in Kleingeld and Krige (eds.), Geostatistics 2000 Cape Town, Volume 1.

Figure 2:
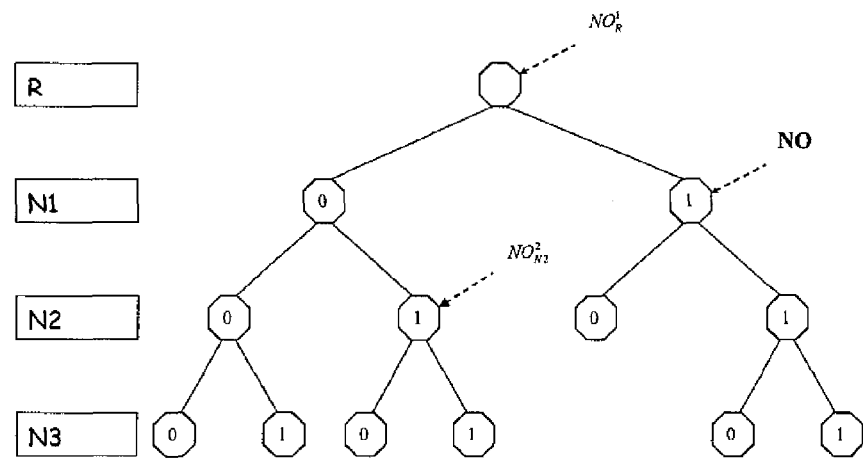
FIG. 2 illustrates a binary tree structure.

This tree has a set of nodes of levels with indices between 0 and number L corresponding to the size of the previously selected exploration window (template). FIG. 2 illustrates the structure of a binary tree (case where the principal property, such as the lithology, can take two values), where R represents the root, N1, N2 and N3 representing three different levels. A node (NO) of level n corresponds to a complete neighborhood of size n. Each node of the tree is associated with: (a) a particular state of a complete neighborhood of principal physical property PP; (b) the empirical histogram of the values of the principal property at the center of the neighborhood conditioned by this state; (c) the empirical histogram of the values of each auxiliary property at the center of the neighborhood conditioned by this state. Thus, according to the example of FIG. 2:

level R comprises a single node denoted by $NO_R^1$. This node comprises the following data:
  the global histogram of the principal property (global proportions for PP=0 and PP=1);
  the global histogram of the value of each auxiliary property; and
level N2 comprises four nodes denoted from $NO_{N2}^1$ to $NO_{N2}^4$. Node $NO_{N2}^2$ for example comprises the following data:
  the histogram of the values of the principal property at the center of the exploration window (pixel $u_c$ knowing that $u_1=0$ and $u_2=1$; and
  the histogram of the values of the auxiliary property at the center of the exploration window (pixel $u_c$) knowing that $u_1=0$ and $u_2=1$.

Since all the pixels of the training images are associated with a value, the tree can be completely constructed, that is the histograms for all the neighborhoods from 0 pixel (central pixel) to L pixels (size of the exploration window) are determined for all the states. Each node of the tree is associated with a probability law (histogram) of principal physical property PP at the central pixel of the neighborhood conditioned by the state of the neighborhood and with a probability law (histogram) of each auxiliary physical property PA conditioned by the same state.

4—Acquiring the Real Data Relative to the Auxiliary Properties

Empirical statistics are available allowing determination of an image of the principal physical property from images of the various auxiliary physical properties. It is therefore necessary, in order to construct the desired reservoir image, to acquire data allowing construction of images of auxiliary physical properties with each image reflecting the real values within the reservoir being studied. In fact, it is necessary to acquire auxiliary property images corresponding to real data and no longer training data resulting from the first training image of the principal property. These auxiliary data are referred to as "real" because they are obtained from measurements performed in the underground zone studied.

To construct these images, each pixel of these images is assigned an auxiliary physical property value obtained from measurements performed within the porous heterogeneous medium.

A seismic survey can for example be carried out to obtain data on the entire zone being studied (that is the zone represented by the images). An image is obtained of each pixel which is filled with a seismic amplitude value. Any other seismic attribute can of course be used.

It is also possible to use a set of logs (continuous measurements performed in a well). These data PC can be acquired at the level of the exploration or production well. These logs, once interpreted, allow determination of the various lithologies encountered while drilling the well. Lithologic proportion maps can be constructed by extrapolation from these data. Data PC can also be real principal property data PP (lithologies, fracturation, presence or not of channels, etc.).

5—Constructing an Image Representative of the Distribution of Principal Property PP Constrained by the Distribution of all the Auxiliary Properties PA in the Reservoir Field This step constructs an image that constitutes a geological model representative of the structure and of the behavior of the underground zone (petroleum reservoir, aquifer), allowing determination of technical parameters relative to prospecting, study or development of the zone. This image represents the distribution of the principal property in the underground zone being studied. It is no longer any distribution, but is the distribution that is supposed to be the best representation of reality. The statistics stored in the tree structure, which are optionally the principal property point data (lithologies filled in with well data for example) and images representing the distribution of several auxiliary properties selected in the previous steps (seismic amplitudes or lithologic proportions for example), are therefore used. This image has the same structure (number and location of the pixels) as the training images.

The image representative of principal property PP is constructed by a sequential algorithm: all the pixels of the image are sequentially simulated at random or in an orderly manner. Simulation of a principal property value associated with a pixel comprises two steps:
determining the probability law of principal physical property PP according to a neighborhood that is not necessarily complete during simulation; and
simulating principal physical property PP.

A neighborhood for which the principal property value is to be determined is first defined around the pixel. This neighborhood is not necessarily complete as illustrated in FIG. 1C, includes the previously simulated pixels and optionally the pixels where the principal property value is measured (PC). These pixels are located in a domain whose size is smaller than or equal to that of the template, that is all the pixels of the neighborhood belong to the pixels of the template. These pixels are consecutive ($u_1$, $u_2$, etc.). They constitute a neighborhood of size s.

Then, for each pixel of the neighborhood, the probability law of the principal property to be simulated is calculated, knowing the state of the neighborhood and the value of each auxiliary property at the simulation pixel, using the empirical statistics stored in the tree. The conditional probability law is calculated by determining, among the conditional probability laws stored in the tree, those corresponding to the point to be simulated, that is those points whose neighborhood is compatible with the neighborhood of the pixel to be simulated. The procedure is as follows:

selecting the nodes of the tree corresponding to level Ns of the tree (level corresponding to a complete neighborhood of size s);

among all the nodes of level Ns, identifying those nodes compatible with the state of the neighborhood, that is those nodes for which the principal property values PP of the pixels of the neighborhood (state) are identical to those of the neighborhood of the pixel to be simulated;

among the identified nodes, selecting those nodes for which the probability law (histogram) of each auxiliary variable is compatible with each node's real datum resulting from the previously constructed image (seismic amplitude that is, for example, obtained from seismic surveys). An auxiliary datum is said to be compatible with a probability law if, for example, this datum ranges between the minimum and the maximum of the auxiliary values of this law, or if this law admits a non-zero probability for the auxiliary datum, finally, calculating the law (histogram) of the principal property of the pixel at the center of the neighborhood using the selected nodes and by multiplying with one another the various probability laws associated with these nodes.

Once the probability law is calculated, the principal property is randomly selected at the simulation pixel according to this law.

Application Examples

The method according to the invention is particularly well suited for constructing an image representative of the spatial organization of lithologies within a petroleum reservoir. The goal is to obtain an image that constitutes a map on which the location of the various lithologies is shown: limestone, sandstone, clay, etc.

Property Selection

To obtain such an image according to the invention, the lithologies (F0, F1 and F2) are thus considered to be principal property (PP). It is decided to use the lithologic proportions as the auxiliary properties.

Construction of the Training Images

1—Training Image of Principal Property PP

To construct the first training image representative of the geometrical structure of principal property PP, a genetic model of meandriform channels is considered. FIG. 3A shows a simulation realization for three lithologies (F0, F1 and F2) on a 79×99-cell Cartesian grid (cell dimension 100 m×100 m). This image is used as training image of the principal property.

2—Training Images of Auxiliary Properties PA

Three auxiliary training images representing the proportions for each one of the three lithologies of the principal training image are constructed from this principal training image (FIG. 3A).

The proportions are calculated by means of a moving average of the principal variable, with a 3×3 window from the principal training image, for each lithology. The result for lithology F1, that is the proportions of lithology F1 from the initial image (FIG. 3A), is illustrated in FIG. 3B.

Statistical Analyses of the Four Training Images

A 150-point concentric exploration window (template) is defined to carry out these analyses and to calculate the empirical statistics from the values contained in all the training images.

Acquisition of the Real Data Relative to the Auxiliary Properties

At this step, empirical statistics are available allowing determination of an image of the lithologies from images of the various lithology proportions. It is therefore necessary, in order to construct the desired reservoir image, to acquire data allowing construction of lithologic proportion images with each image reflecting the real proportions within the reservoir being studied. In fact, it is necessary to acquire images of auxiliary properties corresponding to real data, and no longer training data resulting from the first training image of the principal property.

According to our example, lithologic proportion maps are to be acquired for each one of the three lithologies.

FIG. 3C illustrates a proportion map of the "real" lithology F1, that is to be obtained. It is one of the three maps (one for each lithology) that constrains the construction of the desired image.

Construction of the New Image

Figure 4:
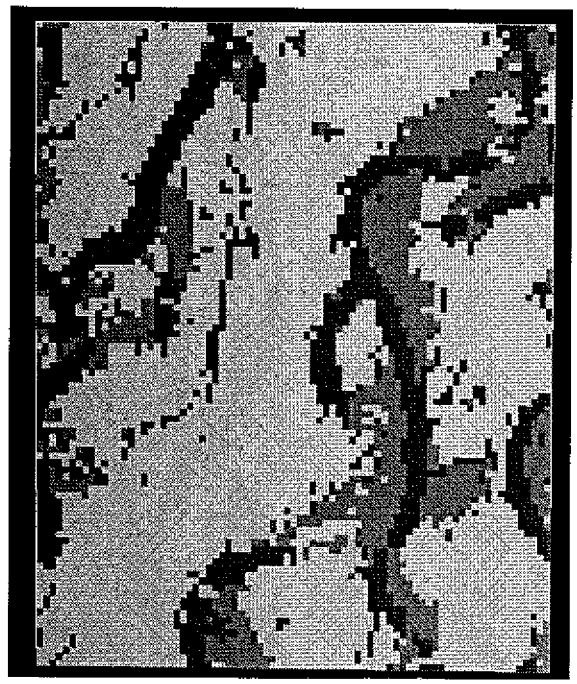
FIG. 4 shows the result obtained for the multipoint simulation according to the invention.

An image representative of the distribution of the lithologies, constrained by the distribution of the three lithologic proportions, is constructed from the statistical analyses. The result is illustrated in FIG. 4. A good reproduction of the continuity of the geometrical structures of the training image is observed. Furthermore, the method allows reproduction conformably of the lithologic proportions of the training image while being consistent with the auxiliary constraint.

Advantages of the Method According to the Invention—Comparison with a Prior Method In order to evaluate the method, the results obtained with the method according to the invention are compared with the non-stationary multipoint method with application of a single constraint described in the following publication:

Chugunova, T. and Hu, L. Y. (2008): "Multiple-Point Simulations Constrained to Continuous Auxiliary Data", Mathematical Geosciences, Vol. 40, No. 2.

This method is limited to the application of a single constraint. To construct an image representative of a petroleum reservoir from multiple auxiliary data (multiple constraints), it is therefore necessary to carry out the following steps:

carrying out three non-stationary multipoint simulations for the three lithologies from the principal and auxiliary training images; and combining the three binary images obtained to form a multi-lithology image. It is therefore necessary to apply a hierarchical order when combining the lithologies.

For example: lithology F1 is dominant with respect to lithology F2 and itself is dominant with respect to lithology F0, denoted by order F1>F2>F0 for purpose of simplification.

Six combinations are possible, but as some give similar results, only four different orders are presented in the simulation results in FIGS. 5A to 5D. Selection of the optimum order depends on the geological knowledge of the depositional environment. In the present case (meandriform channels), the most realistic order corresponds to order F1>F2>F0 (FIG. 5B), the channel lithologies being erosive in relation to the other lithologies.

Figure 5A:
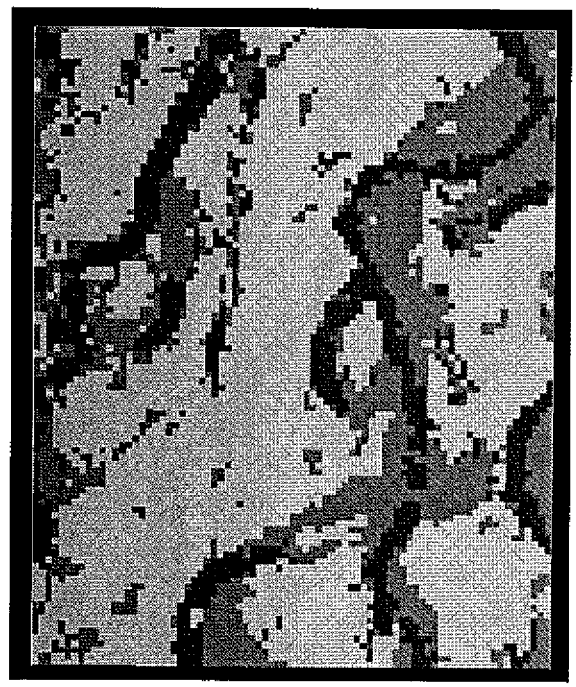
FIGS. 5A to 5D show the results obtained for a non-stationary multipoint method with application of a single auxiliary constraint and for different orders (A to D).
Figure 5B:
Figure 5C:
Figure 5D:

As shown in FIGS. 5A to 5D, the individual multipoint simulation of the three lithologies, followed by a combination of the binary images, allows reproducing of the geometrical structures specific to the meandriform channels. However, this technique does not correctly respect the initial lithologic proportions. In fact, selection of the hierarchical order leads to a quite significant variability of the lithologic proportions (Table 1):

|  | F0 | F1 | F2 |
| --- | --- | --- | --- |
| Training image - FIG. 3A | 65% | 20% | 15% |
| Multipoint result order 0 > 2 > 1 - FIG. 5A | 73% | 14% | 13% |
| Multipoint result order 1 > 2 > 0 - FIG. 5B | 59% | 28% | 13% |
| Multipoint result order 2 > 1 > 0 - FIG. 5C | 59% | 18% | 23% |
| Multipoint result order 2 > 0 > 1 - FIG. 5D | 63% | 13% | 24% |
| Multi-lithology result - FIG. 4 | 65% | 21% | 14% |

It can be noted that the result that best respects the initial proportions of the training image corresponds to the combination of lithologies having a geologic meaning (FIG. 5B). Defining an order of priority for the lithologies is thus essential for implementation of this method.

In order to avoid choosing the combination order requiring knowledge of the geological environment, the method according to the invention is applied (FIG. 4). A better reproduction of the continuity of the geometrical structures of the training image is observed. Furthermore, for all the realizations performed, only the multi-lithology simulations allow reproduction conformably of the lithologic proportions of the training image while being consistent with the auxiliary constraint.

The value of the method according to the invention is thus immediate since the method improves reproduction of the geometrical pattern and reproduction of the constraint. It also allows consistency with the initial lithologic proportions without having to define a lithology priority order. It is also noted that this method provides considerable time saving while avoiding repetitive stages of individual simulation of the various lithologies.

The invention claimed is:

1. A computer implemented method of constructing an image representative of a distribution of a categorical physical property in a porous heterogeneous medium wherein each pixel of the image is associated with a geographic position, comprising:

constructing a first training image by assigning to each pixel of the image a categorical physical property value;

selecting at least two auxiliary physical properties with distributions in space representative of a distribution in space of the categorical physical property;

constructing for each auxiliary physical property, an auxiliary training image by assigning to each pixel of the auxiliary training image an auxiliary physical property value determined from the first training image;

defining for a central pixel for each auxiliary training image, a neighborhood of a number of pixels which are closest to the central pixel, and determining for all neighborhoods from 0 pixels to the number of pixels and for all states, a state representing values of the categorical physical property assumed by the pixels of the neighborhood, an empirical histogram of values of the categorical physical property at the center of the neighborhood conditioned by the state, and an empirical histogram of values of each auxiliary physical property at the center of the neighborhood conditioned by the state;

constructing, for each auxiliary physical property, an image by assigning to each pixel of the constructed images an auxiliary physical property value obtained from measurements performed within the porous heterogeneous medium; and for each pixel of the image to be constructed:
calculating a probability law of the categorical physical property from values taken by all the pixels of the neighborhood of the pixel with values at the pixel of the auxiliary physical properties obtained from the real images, and by multiplying with one another the empirical histograms of each auxiliary physical property associated at the pixel;
determining a categorical physical property value at the pixel of the image to be constructed by carrying out a random selection in the calculated probability law; and
constructing the image representative of the distribution of the categorical physical property by repeating the calculation of the probability law and determining a categorical physical law for each pixel of the image to be constructed; and
displaying the constructed image with a computer.

2. A method as claimed in claim 1, wherein the histograms are determined by simultaneously scanning the auxiliary training images.

3. A method as claimed in claim 2, wherein the histograms are stored in a tree structure having a set of nodes of levels with indices between 0 and the number corresponding to a size of the neighborhood, a node of level n corresponding to a complete neighborhood of size n with each node of the tree being associated with a state of a complete neighborhood of the categorical physical property.

4. A method as claimed in claim 3, wherein the categorical physical property is selected from the properties: lithology, fracturation state and presence of channels.

5. A method as claimed in claim 3, wherein each auxiliary physical property is selected from the properties: lithologic proportions, fracture density and seismic attributes.

6. A method as claimed in claim 4, wherein each auxiliary physical property is selected from the properties: lithologic proportions, fracture density and seismic attributes.

7. A method as claimed in claim 2, wherein the categorical physical property is selected from the properties: lithology, fracturation state and presence of channels.

8. A method as claimed in claim 7, wherein each auxiliary physical property is selected from the properties: lithologic proportions, fracture density and seismic attributes.

9. A method as claimed in claim 2, wherein each auxiliary physical property is selected from the properties: lithologic proportions, fracture density and seismic attributes.

10. A method as claimed in claim 1, wherein the histograms are stored in a tree structure having a set of nodes of levels with indices between 0 and the number corresponding to a size of the neighborhood, a node of level n corresponding to a complete neighborhood of size n with each node of the tree being associated with a state of a complete neighborhood of the categorical physical property.

11. A method as claimed in claim 10, wherein the probability law of the categorical physical property, at a level of a pixel to be simulated, is calculated by the steps:
selecting tree nodes corresponding to a level Ns, corresponding to a complete neighborhood of size s;
among all nodes of level Ns, identifying nodes for which values of the categorical physical property of the neighborhood of pixels are identical to values of a neighborhood of the pixel to be simulated;
among the identified nodes, selecting nodes for which the empirical histogram of each auxiliary physical property is compatible with a corresponding auxiliary physical property obtained from the measurements; and
calculating a categorical physical property law of the pixel to be simulated using the selected nodes and by multiplying with one another the empirical histograms determined for the nodes.

12. A method as claimed in claim 11, wherein each auxiliary physical property is compatible with an empirical histogram if the auxiliary physical property ranges between a minimum and a maximum of the auxiliary values of the empirical histogram.

13. A method as claimed in claim 12, wherein the categorical physical property is selected from the properties: lithology, fracturation state and presence of channels.

14. A method as claimed in claim 12, wherein each auxiliary physical property is selected from the properties: lithologic proportions, fracture density and seismic attributes.

15. A method as claimed in claim 11, wherein each auxiliary physical property is compatible with an empirical histogram if the empirical histogram has a non-zero probability for the auxiliary physical property.

16. A method as claimed in claim 15, wherein the categorical physical property is selected from the properties: lithology, fracturation state and presence of channels.

17. A method as claimed in claim 15, wherein each auxiliary physical property is selected from the properties: lithologic proportions, fracture density and seismic attributes.

18. A method as claimed in claim 11, wherein the categorical physical property is selected from the properties: lithology, fracturation state and presence of channels.

19. A method as claimed in claim 11, wherein each auxiliary physical property is selected from the properties: lithologic proportions, fracture density and seismic attributes.

20. A method as claimed in claim 10, wherein the categorical physical property is selected from the properties: lithology, fracturation state and presence of channels.

21. A method as claimed in claim 20, wherein each auxiliary physical property is selected from the properties: lithologic proportions, fracture density and seismic attributes.

22. A method as claimed in claim 10, wherein each auxiliary physical property is selected from the properties: lithologic proportions, fracture density and seismic attributes.

23. A method as claimed in claim 1, wherein the categorical physical property is selected from the properties: lithology, fracturation state and presence of channels.

24. A method as claimed in claim 23, wherein each auxiliary physical property is selected from the properties: lithologic proportions, fracture density and seismic attributes.

25. A method as claimed in claim 1, wherein each auxiliary physical property is selected from the properties: lithologic proportions, fracture density and seismic attributes.

* * * * *